Jan. 22, 1924.
C. W. BECK
1,481,533
STEERING WHEEL
Filed May 21, 1923
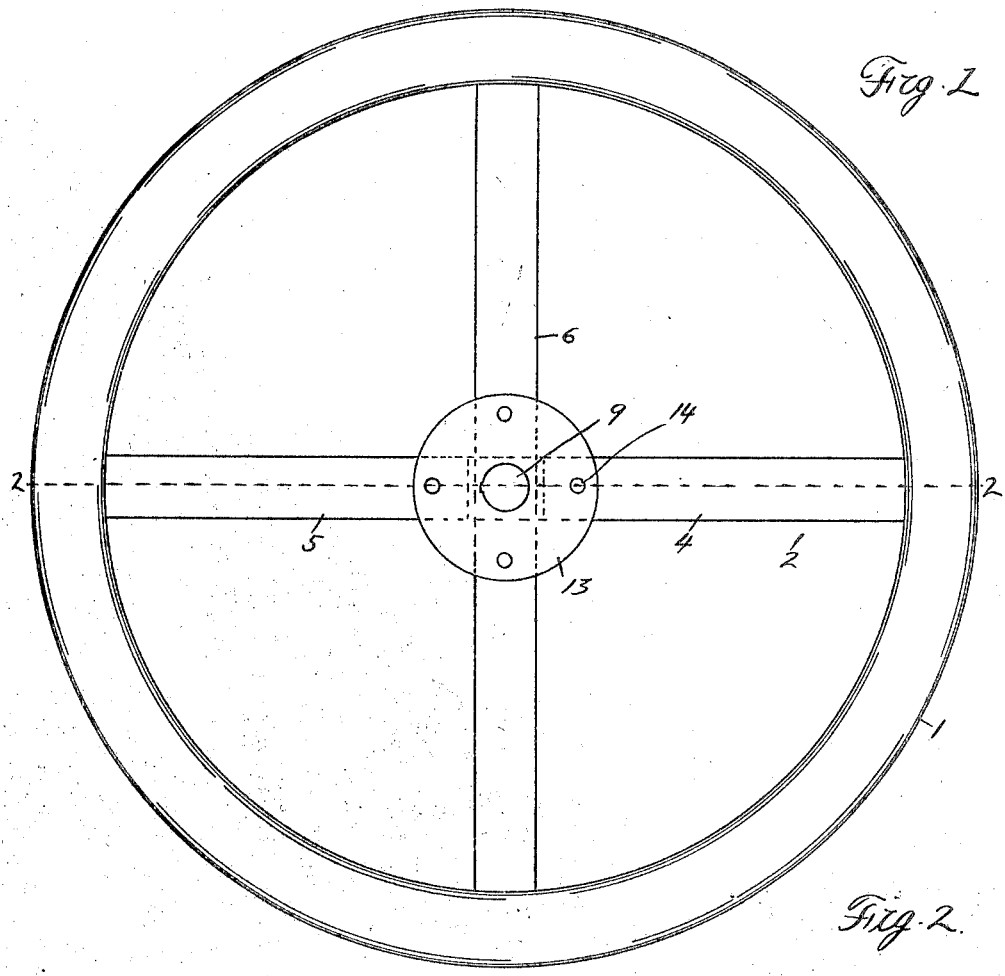
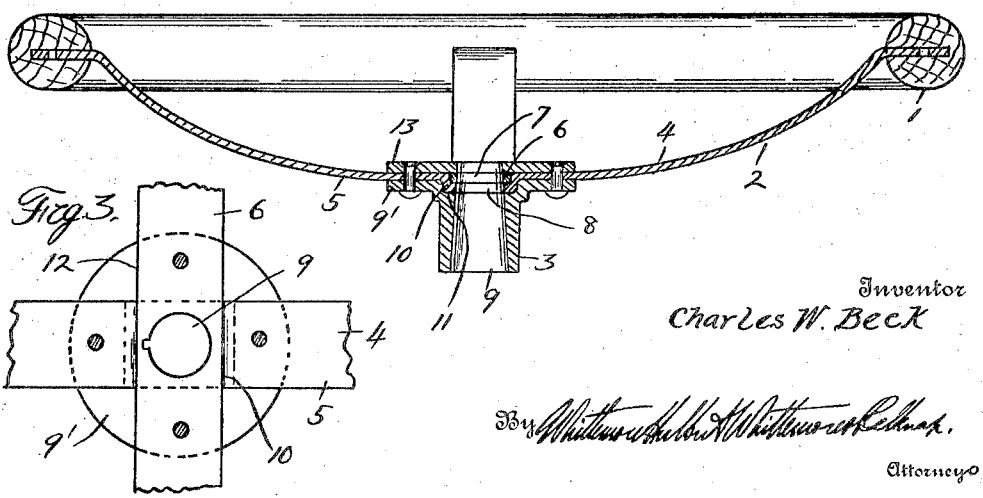
Inventor
Charles W. Beck
Attorneys Patented Jan. 22, 1924.

1,481,533

UNITED STATES PATENT OFFICE.

CHARLES W. BECK, OF DETROIT, MICHIGAN, ASSIGNOR TO BECK-FROST CORPORATION, OF DETROIT, MICHIGAN, A CORPORATION OF MICHIGAN.

STEERING WHEEL.

Original application filed September 20, 1922, Serial No. 589,475. Divided and this application filed May 21, 1923. Serial No. 640,591.

*To all whom it may concern:*

Be it known that I, CHARLES W. BECK, a citizen of the United States of America, residing at Detroit, in the county of Wayne and State of Michigan, have invented certain new and useful Improvements in Steering Wheels, of which the following is a specification, reference being had therein to the accompanying drawings.

This invention relates to steering wheels for motor vehicles, boats and the like, but refers particularly to wheels wherein the spider or metal part is preferably of the built-up and assembled type.

An object of the invention is to provide a strong and durable steering wheel in which the metal parts of the spider are rigidly secured together by simple and effective means.

Another object is to provide a strong and durable wheel which is simple in construction and which can be manufactured at a comparatively low cost.

Another object is to provide a steering wheel in which the spider arms are composed of two members only which preferably cross each other at the center and which are rigidly and permanently secured together.

With the above and other objects in view, the invention consists of certain novel features of construction, combination and arrangement of parts as will be more fully described and particularly pointed out in the appended claims.

This application is a division of my co-pending application, Serial No. 589,475, filed September 20, 1922, for steering wheel and method of forming the same.

In the accompanying drawing:—

Figure 1 is a top plan view of a steering wheel embodying my invention;

Figure 2 is a sectional view taken on line 2—2 of Figure 1;

Figure 3 is a fragmentary top plan view with the cover plate removed.

Referring now to the drawing in which like characters of reference designate corresponding parts throughout the several views, the numeral 1 designates a rim, preferably of wood, supported upon a spider 2 which includes a hub 3 and a plurality of radially extending arms 4. The hub and arms may be constructed of any suitable material and are preferably of the shape shown.

The spider arms 4 are preferably composed of two relatively long members 5 and 6 respectively which cross each other at the center and which are secured at their outer ends to the rim. These members preferably intersect each other at right angles above the hub and are provided with openings 7 and 8 respectively which register with a tapering bore 9 in the hub. The lowermost member 5 rests upon an annular flange 9' formed integral with the hub at the upper end thereof and is preferably provided midway of its length with a substantially U-shaped depressed portion 10 which engages a pair of aligned relatively deep radially extending grooves 11 in the hub upon diametrically opposite sides of the bore 9 and which receives the central portion of the member 6. This member preferably engages a pair of aligned relatively shallow radially extending grooves 12 in the flange 9', the arrangement being such that the upper surface of the member 6 is flush with the adjacent upper surfaces of the member 5.

To conceal the intersecting portions of the members 5 and 6 and to reinforce the spider construction, an annular cover plate 13 is preferably secured to the flange 9' by means of bolts 14 which extend through the members 5 and 6 respectively. The top plate 13 and the hub are preferably made of die castings while the two arm members 5 and 6 respectively are preferably made of stampings. Without departing from the invention, the assembly of these parts may be accomplished by casting the stamped arms into the top plate and hub by forming these parts into one casting around the arms thereof.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim as my invention is:

1. A steering wheel comprising a hub, an annular flange carried by said hub, said hub and flange having grooves of different depths formed therein, intersecting members engaging said grooves, a rim secured to said members, and means for securing said members to said flange.

2. A steering wheel comprising a hub, an annular flange carried by said hub, intersecting members engaging said flange, one member having a depressed portion engaging a recess in said hub and receiving a portion of the other member, a rim secured to said members, and means for securing said members to said flange.

3. A steering wheel comprising a hub, an annular flange carried by said hub having grooves of different depths, intersecting members engaging said grooves, said hub having a tapering bore, said members having openings registering with said bore, a rim secured to said members, and means for securing said members to said flange.

4. A steering wheel comprising a hub, an annular flange carried by said hub, intersecting members engaging said flange, one member having a depressed portion for receiving a portion of the other member whereby the adjacent upper surfaces of said members are in alignment, a flat cover plate engaging the aligned upper surfaces of said members, a rim secured to said members, and means securing said plate, members and flange together.

5. A steering wheel comprising a hub, a pair of members having portions crossing each other over said hub, a cover plate concealing the crossed portions of said members, and means for securing said plate and arms to said hub.

6. In a steering wheel, a hub having a flange, intersecting arms engaging said hub and flange with their adjacent upper surfaces in alignment, a flat cover plate engaging the aligned upper surfaces of said arms, and means for securing said flange, arms and cover plate together.

In testimony whereof I affix my signature.

CHARLES W. BECK.